United States Patent
Lau et al.

(10) Patent No.: US 10,157,373 B1
(45) Date of Patent: Dec. 18, 2018

(54) METHOD OF RECONDITIONING AN ELECTRONIC PROCESSING DEVICE

(71) Applicants: Gary Q. Lau, Kowloon (HK); Paul Anthony Smith, Kowloon (HK)

(72) Inventors: Gary Q. Lau, Kowloon (HK); Paul Anthony Smith, Kowloon (HK)

(73) Assignee: EcoRenew DMCC, Dubai (AE)

( * ) Notice: Subject to any disclaimer, the term of this patent is extended or adjusted under 35 U.S.C. 154(b) by 0 days.

(21) Appl. No.: 15/671,444

(22) Filed: Aug. 8, 2017

(51) Int. Cl.
*G01R 31/28* (2006.01)
*G06Q 10/00* (2012.01)

(52) U.S. Cl.
CPC ................................. *G06Q 10/30* (2013.01)

(58) Field of Classification Search
CPC ...................................................... G06Q 10/30
See application file for complete search history.

(56) References Cited

U.S. PATENT DOCUMENTS

| 2016/0057614 | A1* | 2/2016 | Holcman | H04W 8/24 455/414.1 |
| 2017/0169401 | A1* | 6/2017 | Beane | G06Q 10/30 |
| 2017/0330158 | A1* | 11/2017 | Librizzi | G06Q 10/30 |

FOREIGN PATENT DOCUMENTS

| CN | 102967820 A | 3/2013 |
| CN | 1022335790 A | 3/2014 |
| CN | 204442481 U | 1/2015 |
| CN | 205042752 U | 2/2016 |

OTHER PUBLICATIONS

PCT/CN2017/111285, ISR, Ecorenew, mailing date Mar. 29, 2018.

\* cited by examiner

*Primary Examiner* — Seahvosh Nikmanesh

(57) ABSTRACT

The invention provides a method of reconditioning a mobile electronic processing device. The method comprises firstly disassembling a mobile electronic processing device to at least obtain a main processor board assembly having an operational International Mobile Equipment Identity (IMEI) of the disassembled mobile electronic processing device stored in a memory of the main processor board assembly. Then, to assessing suitability of the main processor board assembly for reassembly in a mobile electronic processing device. If suitable, to reassembling said main processor board assembly with a reconditioned or new LCD screen assembly and a reconditioned or new housing assembly to thereby provide a reconditioned mobile electronic processing device taking said IMEI of the disassembled mobile electronic processing device as its operational IMEI.

15 Claims, 8 Drawing Sheets

| SAM-PLE # | 2D BARCODE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | NO. OF CHAR |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 2036325008H8MY0119365823879514412160780158 | 2 | 0 | 3 | 6 | 3 | 2 | 5 | 0 | 0 | 8 | 8 | H | 8 | M | Y | 0 | 1 | 1 | 9 | 3 | 6 | 5 | 8 | 2 | 3 | 8 | 7 | 9 | 5 | 1 | 4 | 4 | 1 | 2 | 1 | 6 | 0 | 7 | 8 | 0 | 1 | 5 | 8 | 44 |
| 2 | 2056235175H8MY03193707248838351458780458 | 2 | 0 | 5 | 6 | 2 | 3 | 5 | 1 | 7 | 5 | 1 | H | 8 | M | Y | 0 | 3 | 1 | 9 | 3 | 7 | 0 | 7 | 2 | 4 | 8 | 8 | 3 | 8 | 1 | 3 | 5 | 1 | 4 | 5 | 8 | 7 | 8 | 0 | 4 | 5 | 8 | | 44 |
| 3 | 0066317419H8MY03192580224825361155858175 | 0 | 0 | 6 | 6 | 3 | 1 | 7 | 4 | 1 | 9 | H | 8 | M | Y | 0 | 3 | 1 | 9 | 2 | 5 | 8 | 0 | 2 | 2 | 4 | 8 | 2 | 5 | 3 | 6 | 1 | 1 | 5 | 5 | 8 | 5 | 8 | 1 | 7 | 5 | 8 | | | 44 |
| 4 | 2906216075H8MY03192580224825441159987825 | 2 | 9 | 0 | 6 | 2 | 1 | 6 | 0 | 7 | 5 | H | 8 | M | Y | 0 | 3 | 1 | 9 | 2 | 5 | 8 | 0 | 2 | 2 | 4 | 8 | 2 | 5 | 4 | 4 | 1 | 1 | 5 | 5 | 9 | 8 | 7 | 8 | 2 | 5 | | | | 44 |
| 5 | 0066257159 7H8MY0329215424678274019594812518 | 0 | 0 | 6 | 6 | 2 | 5 | 7 | 1 | 5 | 9 | 7 | H | 8 | M | Y | 0 | 3 | 2 | 9 | 2 | 1 | 5 | 4 | 2 | 4 | 6 | 7 | 8 | 2 | 7 | 4 | 0 | 1 | 9 | 5 | 9 | 4 | 8 | 1 | 2 | 5 | 1 | 8 | 44 |
| 6 | 2906296237H8MY04191580228783401185588145 18 | 2 | 9 | 0 | 6 | 2 | 9 | 6 | 2 | 3 | 7 | H | 8 | M | Y | 0 | 4 | 1 | 9 | 1 | 5 | 8 | 0 | 2 | 2 | 8 | 7 | 8 | 3 | 4 | 0 | 1 | 1 | 8 | 5 | 5 | 8 | 8 | 1 | 4 | 5 | 1 | 8 | | 44 |
| 7 | 2056341336H8MY01192713232807452060080058 | 2 | 0 | 5 | 6 | 3 | 4 | 1 | 3 | 3 | 6 | H | 8 | M | Y | 0 | 1 | 1 | 9 | 2 | 7 | 1 | 3 | 2 | 3 | 2 | 8 | 0 | 7 | 4 | 5 | 2 | 0 | 6 | 0 | 0 | 8 | 0 | 0 | 5 | 8 | | | | 44 |
| 8 | 2056193950H8MY03191730236777461961379958 | 2 | 0 | 5 | 6 | 1 | 9 | 3 | 9 | 5 | 0 | H | 8 | M | Y | 0 | 3 | 1 | 9 | 1 | 7 | 3 | 0 | 2 | 3 | 6 | 7 | 7 | 7 | 4 | 6 | 1 | 9 | 6 | 1 | 3 | 7 | 9 | 9 | 5 | 8 | | | | 44 |
| 9 | 2056197754H8MY03191706240797421185797985 18 | 2 | 0 | 5 | 6 | 1 | 9 | 7 | 7 | 5 | 4 | H | 8 | M | Y | 0 | 3 | 1 | 9 | 1 | 7 | 0 | 6 | 2 | 4 | 0 | 7 | 9 | 7 | 4 | 2 | 1 | 1 | 8 | 5 | 7 | 9 | 7 | 9 | 8 | 5 | 1 | 8 | | 44 |
| 10 | 2056265172 6H8MY03192663239814011758980758 | 2 | 0 | 5 | 6 | 2 | 6 | 5 | 1 | 7 | 2 | 6 | H | 8 | M | Y | 0 | 3 | 1 | 9 | 2 | 6 | 6 | 3 | 2 | 3 | 9 | 8 | 1 | 4 | 0 | 1 | 1 | 7 | 5 | 8 | 9 | 8 | 0 | 7 | 5 | 8 | | | 44 |
| 11 | 2036312172H8MY03191926632398141017589807 58 | 2 | 0 | 3 | 6 | 3 | 1 | 2 | 1 | 7 | 2 | H | 8 | M | Y | 0 | 3 | 1 | 9 | 1 | 9 | 2 | 6 | 6 | 3 | 2 | 3 | 9 | 8 | 1 | 4 | 1 | 0 | 1 | 7 | 5 | 8 | 9 | 8 | 0 | 7 | 5 | 8 | | 44 |
| 12 | 0106246480H8MY03291002260883135146168055 18 | 0 | 1 | 0 | 6 | 2 | 4 | 6 | 4 | 8 | 0 | H | 8 | M | Y | 0 | 3 | 2 | 9 | 1 | 0 | 0 | 2 | 2 | 6 | 0 | 8 | 8 | 3 | 1 | 3 | 5 | 1 | 4 | 6 | 1 | 6 | 8 | 0 | 5 | 5 | 1 | 8 | | 44 |
| 13 | 2906252338H8MY01191577236770402157680958 18 | 2 | 9 | 0 | 6 | 2 | 5 | 2 | 3 | 3 | 8 | H | 8 | M | Y | 0 | 1 | 1 | 9 | 1 | 5 | 7 | 7 | 2 | 3 | 6 | 7 | 7 | 0 | 4 | 0 | 2 | 1 | 5 | 7 | 6 | 8 | 0 | 9 | 5 | 8 | 1 | 8 | | 44 |
| 14 | 0463451518H8MY01292008232805411257181258 | 0 | 4 | 6 | 3 | 4 | 5 | 1 | 5 | 1 | 8 | H | 8 | M | Y | 0 | 1 | 2 | 9 | 2 | 0 | 0 | 8 | 2 | 3 | 2 | 8 | 0 | 5 | 4 | 1 | 1 | 2 | 5 | 7 | 1 | 8 | 1 | 2 | 5 | 8 | | | | 44 |
| 15 | 2056333044 2H8MY0119373323878937115624805 518 | 2 | 0 | 5 | 6 | 3 | 3 | 3 | 0 | 4 | 4 | 2 | H | 8 | M | Y | 0 | 1 | 1 | 9 | 3 | 7 | 3 | 3 | 2 | 3 | 8 | 7 | 8 | 9 | 3 | 7 | 1 | 1 | 5 | 6 | 2 | 4 | 8 | 0 | 5 | 5 | 1 | 8 | 44 |
| 16 | 0066315335H8MY04293153234852431145929806 558 | 0 | 0 | 6 | 6 | 3 | 1 | 5 | 3 | 3 | 5 | H | 8 | M | Y | 0 | 4 | 2 | 9 | 3 | 1 | 5 | 3 | 2 | 3 | 4 | 8 | 5 | 2 | 4 | 3 | 1 | 1 | 4 | 5 | 9 | 2 | 8 | 0 | 6 | 5 | 1 | 8 | | 44 |
| 17 | 2056360203H8MY01193733242789381256047915 18 | 2 | 0 | 5 | 6 | 3 | 6 | 0 | 2 | 0 | 3 | H | 8 | M | Y | 0 | 1 | 1 | 9 | 3 | 7 | 3 | 3 | 2 | 4 | 2 | 7 | 8 | 9 | 3 | 8 | 1 | 2 | 5 | 6 | 0 | 4 | 7 | 9 | 1 | 5 | 1 | 8 | | 44 |
| 18 | 0106243098 5H8MY03292001245827401165958185 518 | 0 | 1 | 0 | 6 | 2 | 4 | 3 | 0 | 9 | 8 | 5 | H | 8 | M | Y | 0 | 3 | 2 | 9 | 2 | 0 | 0 | 1 | 2 | 4 | 5 | 8 | 2 | 7 | 4 | 0 | 1 | 1 | 6 | 5 | 9 | 5 | 8 | 1 | 8 | 5 | 1 | 8 | 44 |
| 19 | 2056247039 2H8MY03191717237802421196079915 18 | 2 | 0 | 5 | 6 | 2 | 4 | 7 | 0 | 3 | 9 | 2 | H | 8 | M | Y | 0 | 3 | 1 | 9 | 1 | 7 | 1 | 7 | 2 | 3 | 7 | 8 | 0 | 2 | 4 | 2 | 1 | 1 | 9 | 6 | 0 | 7 | 9 | 1 | 5 | 1 | 8 | | 44 |
| 20 | 0076175425H8MY03191717238792421458980558 | 0 | 0 | 7 | 6 | 1 | 7 | 5 | 4 | 2 | 5 | H | 8 | M | Y | 0 | 3 | 1 | 9 | 1 | 7 | 1 | 7 | 2 | 3 | 8 | 7 | 9 | 2 | 4 | 2 | 1 | 4 | 5 | 8 | 9 | 8 | 0 | 5 | 5 | 8 | | | | 44 |
| 21 | 2026333104 5H8MY01191630226790451857681358 | 2 | 0 | 2 | 6 | 3 | 3 | 3 | 1 | 0 | 4 | 5 | H | 8 | M | Y | 0 | 1 | 1 | 9 | 1 | 6 | 3 | 0 | 2 | 2 | 6 | 7 | 9 | 0 | 4 | 5 | 1 | 8 | 5 | 7 | 6 | 8 | 1 | 3 | 5 | 8 | | | 44 |
| 22 | 2906255265 8H8MY0319158124277441206118065 518 | 2 | 9 | 0 | 6 | 2 | 5 | 5 | 2 | 6 | 5 | 8 | H | 8 | M | Y | 0 | 3 | 1 | 9 | 1 | 5 | 8 | 1 | 2 | 4 | 2 | 7 | 7 | 4 | 4 | 1 | 2 | 0 | 6 | 1 | 1 | 8 | 0 | 6 | 5 | 1 | 8 | | 44 |

Fig. 5C

METHOD OF RECONDITIONING AN ELECTRONIC PROCESSING DEVICE

FIELD OF THE INVENTION

The invention relates to a method of reconditioning and/or repairing an electronic processing device and more particularly, but not exclusively, to a method for reconditioning a mobile electronic processing device.

BACKGROUND OF THE INVENTION

There is a growing requirement for repair and reconditioning of mobile electronic processing devices such as smart phones, phablets, tablet computers or the like in view of the high retail cost of many of these devices. Repair services normally assist individual consumers in making repairs to parts and components of their mobile electronic processing devices. A major area of repair is the screen glass, but other repairs such as replacement of batteries and even replacement of main processor boards are sometimes required. However, the fastest growing process area is the process of reconditioning discarded, returned or damaged devices in large volumes. A reconditioning process may involve a reconditioning facility receiving a batch of a very large number of discarded, returned or damaged devices from a customer such as, for example, a cellular network operator, an insurance provider or from other sources, to disassembling said devices, to cleaning, reconditioning, repairing and testing structural and operational components and parts (hereinafter referred to only as "components") of the devices, and subsequently reassembling as many devices as can be recovered from the components comprising said received batch of devices. The yield of reconditioned devices from a large batch may be as high as 90% or even higher.

Often the processing facility receiving the discarded, returned or damaged devices in large volumes is located in a state or country remote from the state or country from which the discarded, returned or damaged devices have been sourced, e.g. the processing facility is located in a competitive wage country far from the country of operation of the cellular network operator, the insurance provider or other sources from which the discarded, returned or damaged devices have been obtained. Whilst performing the reconditioning process in a facility located in a competitive wage country reduces the cost per unit for a reconditioned device, it involves shipping the large volumes of devices from the source country to the processing facility country which greatly lengthens the period of time from sending a batch of discarded, returned or damaged devices from the source country to the processing facility and subsequently receiving back a batch of reconditioned operational devices. A further problem is that the unique identities of the devices being reconditioned are inoperational for at least the aforementioned period of time.

There is a need to more efficiently recondition such devices and return them to operation.

OBJECTS OF THE INVENTION

An object of the invention is to mitigate or obviate to some degree one or more problems associated with known methods of reconditioning mobile electronic processing devices.

The above object is met by the combination of features of the main claims; the sub-claims disclose further advantageous embodiments of the invention.

Another object of the invention is to mitigate or obviate to some degree one or more problems associated with known methods of reconditioning mobile electronic processing devices.

Another object of the invention is to provide an improved reconditioning process for electronic processing devices.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of reconditioning a mobile electronic processing device. The method comprises firstly disassembling a mobile electronic processing device to at least obtain a main processor board assembly having an operational International Mobile Equipment Identity (IMEI) of the disassembled mobile electronic processing device stored in a memory of the main processor board assembly. Then, secondly, to assessing suitability of the main processor board assembly for reassembly in a mobile electronic processing device. If suitable, thirdly, to reassembling said main processor board assembly with a reconditioned or new LCD screen assembly and a reconditioned or new housing assembly to thereby provide a reconditioned mobile electronic processing device taking said IMEI of the disassembled mobile electronic processing device as its operational IMEI.

In a second main aspect, the invention provides a non-transitory computer readable medium storing machine readable code which, when executed by a processor, causes a system for reconditioning a mobile electronic processing device to assess suitability of a main processor board assembly for reassembly in a mobile electronic processing device by: subjecting a main processor board assembly obtained from a disassembled mobile electronic processing device to a plurality of tests where at least two of said tests are of a different technical nature to each other; and assessing test data derived from each of said plurality of tests to determine to a selected or calculated degree of confidence whether or not the tested main processor board assembly is to be considered as suitable for assembly in a mobile electronic processing device of a type to which the tested main processor board assembly belongs.

In a third main aspect, the invention provides a system for reconditioning a mobile electronic processing device, the system comprising: a system for disassembling a mobile electronic processing device to at least obtain a main processor board assembly having an operational International Mobile Equipment Identity (IMEI) of the disassembled mobile electronic processing device stored in a memory of the main processor board assembly; a system assessing suitability of the main processor board assembly for reassembly in a mobile electronic processing device; and, if suitable, and a system for reassembling said main processor board assembly with a reconditioned or new LCD screen assembly and a reconditioned or new housing assembly to thereby provide a reconditioned mobile electronic processing device taking said IMEI of the disassembled mobile electronic processing device as its operational IMEI.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 5C shows a table of data read from a 2D barcode of a type associated with a surface of a LCD assembly of a mobile electronic processing device.

DESCRIPTION OF PREFERRED EMBODIMENTS

Figure 1:
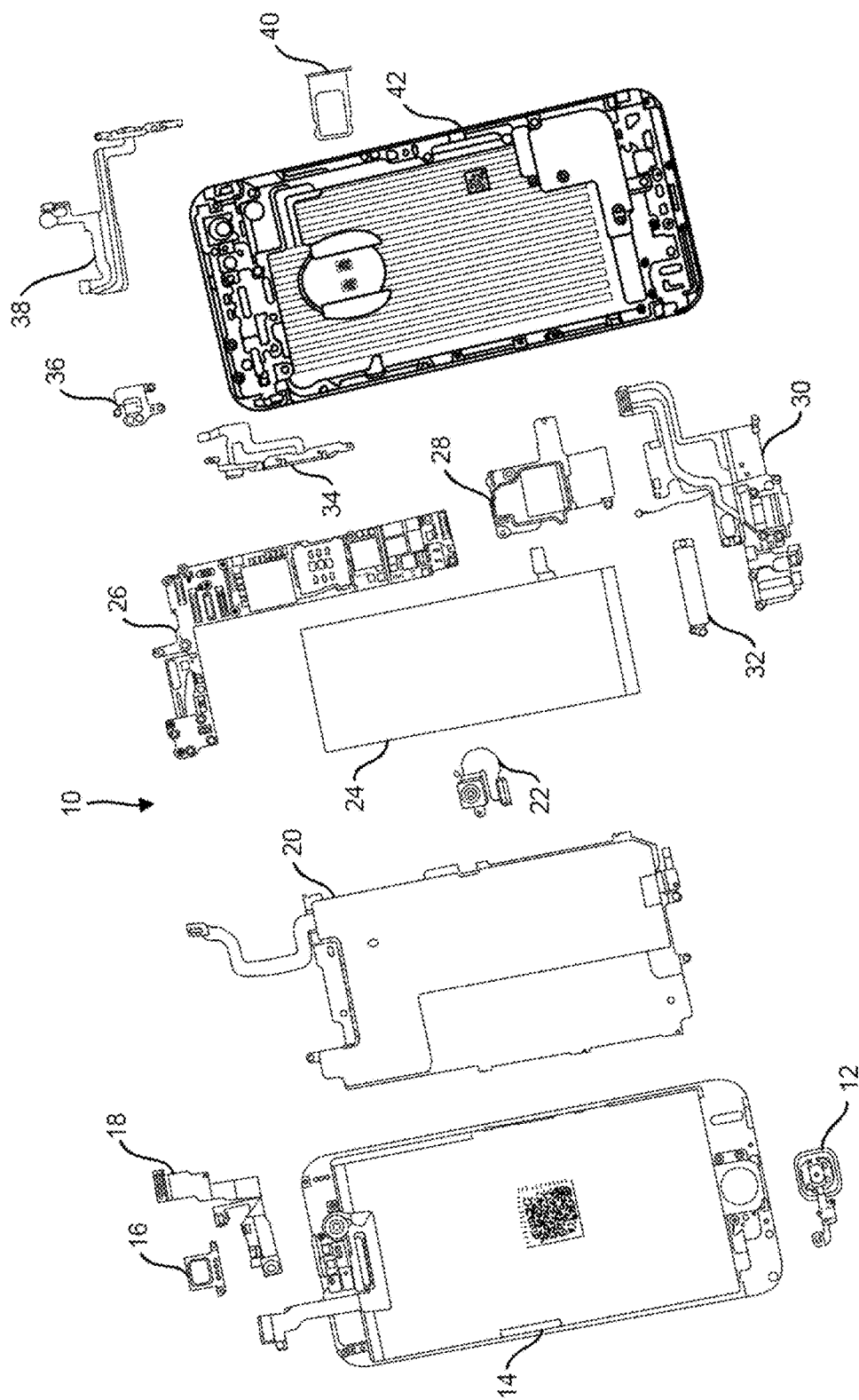
FIG. 1 is an exploded view of a mobile electronic processing device showing its major components in a disassembled arrangement.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS, may be implemented in various forms of hardware, software or combinations thereof. Preferably, these elements are implemented in a combination of hardware and software on one or more appropriately programmed general-purpose devices, which may include a processor, memory and input/output interfaces.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The description of the present invention as provided herein will be described and illustrated with respect to a process of reconditioning mobile electronic processing devices such as smart phones, but it will be appreciated that such process is equally applicable to other electronic processing devices such as phablets, tablet computers, laptop computers, personal computers (PCs) and similar electronic processing apparatuses. However, the present invention is particularly applicable to mobile electronic processing devices such as smart phones given their comparatively small size which renders shipping large volumes of devices less costly than larger electronic processing devices and in light of their generally high retail value or purchase cost.

It will also be appreciated that the component assessment and/or testing processes described herein are not limited to only a reconditioning process for large volumes of electronic processing devices, but are equally applicable to repair of such devices or even to quality control in assembling new devices.

Referring to the drawings, FIG. 1 is an exploded view of a mobile electronic processing device 10 showing its main components in a disassembled arrangement. FIG. 1 is, in fact, an exploded view of an iPhone 6® as supplied by Apple Inc. The iPhone 6® is an example of a high retail value mobile electronic processing device to which the methods of the present invention can be applied, but is provided here merely by way of example, and the methods can equally be applied to other iPhone® models and mobile electronic processing devices from other mobile communication manufacturers/suppliers. The mobile electronic processing device 10 of FIG. 1 comprises a home button module 12 for controlling the device 10, a liquid crystal display (LCD) assembly 14, an ear piece speaker module 16, a front camera module and sensor cable 18, a LCD shield plate and home cable 20, a rear camera module 22, a battery 24, a motherboard or main processor board 26, a loud speaker module 28, a lightning connector and headphone jack module 30, a home button bracket 32, a volume flex cable 34, a wifi antenna module 36, a power button cable 38, a SIM tray 40 and a housing or back cover 42.

The mobile electronic processing device 10 of FIG. 1 can be considered as comprising three main modules or assemblies: (i) the LCD assembly 14 combined with the LCD shield plate and home cable 20 and any ancillary components which normally attach thereto, e.g. the home button module 12, the ear piece speaker module 16 and the front camera module and sensor cable 18; (ii) the motherboard or main processor board 26, battery 24, and any ancillary components which normally attach thereto, e.g. the loud speaker module 28 and the lightning connector and headphone jack module 30; and (iii) the back cover 42 and any ancillary components which normally attach thereto, e.g. the volume flex cable 34, the wifi antenna module 36, the power button cable 38 and the a SIM tray 40. It will be understood that, for different mobile electronic processing devices, the arrangement and connection or mounting of ancillary components may be different to that illustrated in FIG. 1, but, generally speaking, most mobile electronic processing devices can be considered as comprising the three main modules or assemblies as identified above, namely (i) an LCD screen assembly, (ii) a motherboard or main processor board assembly, and (iii) a housing or back cover assembly. Consequently, final assembly of the mobile electronic processing device can be considered as a process of sandwiching the motherboard or main processor board assembly between the LCD screen assembly and the housing or back cover assembly.

Figure 2:
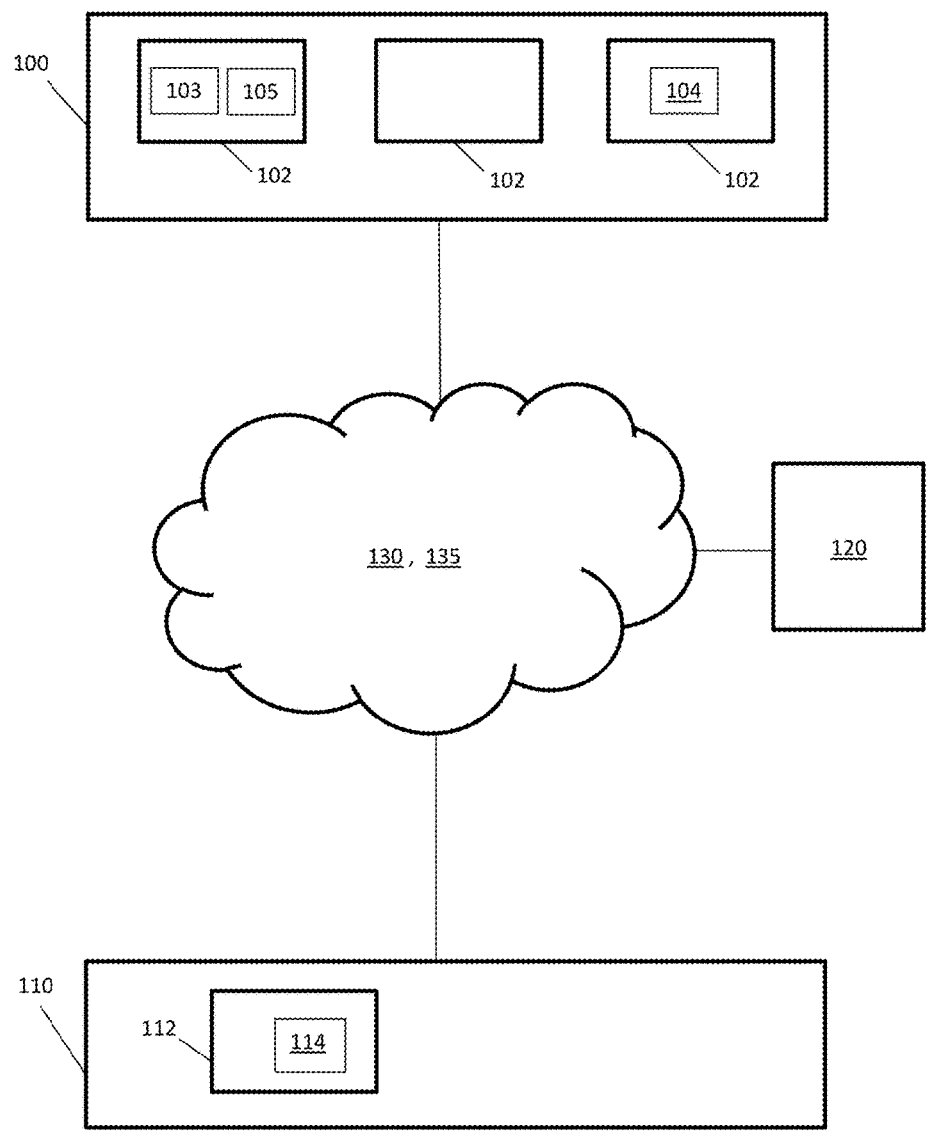
FIG. 2 is a schematic diagram of a system for assessing the suitability or authenticity of a component of the mobile electronic processing device of FIG. 1.

FIG. 2 shows a system for manually, but preferably automatically or partially automatically, assessing the suitability or authenticity of a component of a mobile electronic processing device such as device 10 of FIG. 1. The system comprises a test system 100 comprising a plurality of work stations 102 enabling different ones of a plurality of tests to be applied to one or more components of the mobile electronic processing device 10. Preferably, two or more of the tests are of different technical character to each other. Each work station 102 is arranged to transfer test data to an assessment system 110. The assessment system may comprise a data processing system 112 which receives test data directly from each work station 102 or from a database 120 to which the test data from each work station 102 is transmitted for storage and subsequent retrieval. The work stations 102, database 120 and data processing system 112 may be linked by a secure private data network 130 or via a public network such as the internet 135 using suitable security protocols to ensure confidentiality of transmitted data. The work stations 102 need not be co-located, but could be located at distributed locations or positions within a facility or within a number of linked facilities. In this context, the term "facility" refers to a processing plant, factory or the like where human operators, automatically operated machines, and/or robotic equipment are employed to undertake one or more of the various methods and procedures described herein.

The data processing system 112 is configured to execute software stored in memory 114 to process test data derived from each of said plurality of tests on a component to assess or to determine to a selected or calculated degree of confidence whether or not said tested component is to be considered as a suitable component for assembly in a mobile electronic processing device 10 of a type to which the tested component belongs. More specifically, the assessment of the test data is intended to enable a determination to be made as to whether or not a tested component is an authentic component or the mobile electronic processing device 10.

It will be understood that each component under test preferably has associated with it an identifier to enable tracking of the component under test and once tested. The identifier may comprise an identifier associated with or belonging to a selected mobile electronic processing device 10 or a major component, module or assembly of said mobile electronic processing device 10. For example, the identifier may comprise an International Mobile Equipment Identity (IMEI) of a selected mobile electronic processing device 10. The IMEI is normally stored in memory associated with the motherboard or main processor board 26 of the mobile electronic processing device 10 and uniquely identifies the selected mobile electronic processing device 10 or at least uniquely identifies the motherboard or main processor board 26 of said mobile electronic processing device 10.

When repairing or reconditioning a mobile electronic processing device 10, it may be necessary to clean, repair, recondition and/or even replace one or more components of the device 10. One objective is to provide a method of determining whether or not any component obtained from a disassembled mobile electronic processing device 10 or from another source for use in the repair or reconditioning process is suitable for assembly into such a device 10, for example that the component is an authentic component manufactured to standards and/or parameters mandated by the end-product manufacturer/supplier of such device 10.

It will be understood that different components may be subjected to different sets of tests or subsets of tests for the purpose of determining if it is operating or functioning correctly and for the purpose of assessing its suitably for reassembly into a mobile electronic processing device 10. The tests described hereinafter, which include tests of a plurality of different technical characters, are examples of the tests included in the plurality of tests from which sets or subsets of tests can be selected for different types of components. Whilst the following description will describe said tests with respect to only a selected number of components of a mobile electronic processing device 10, it will be understood that the methodology of such tests can be applied to components of other types not described herein in detail using suitable adjustments according to the component type. For example, a hardness test might be used on the back cover 42 of the mobile electronic processing device 10, but would likely not be applied to the screen glass of the LCD assembly 14.

A first test or a first series of tests of a first technical character for a selected component of the mobile electronic processing device 10 may involve visual inspection of the component. Visual inspection tests may involve a human operator or an intelligent imaging system 140 (FIG. 2) observing visible features of a component and making decisions on whether or not a feature is present and/or making judgments on quality of a present feature. A result, such a visible inspection can provide a "yes" or "no" answer and thus be entered as test data "1" or "0" in a suitably enabled interface 103 (FIG. 2) at a work station 102 where the test is being conducted such that said inputted data can be transmitted to the database 120 and/or the data processing system 112. A test such as this can provide an absolute degree of certainty of the presence or absence of an expected visible feature. As such, where an expected feature is found to be absent, this may provide an absolute degree of certainty that the component is not a suitable or authentic component. However, where an expected feature is identified as being present, this will not necessarily confirm that the component is suitable or authentic, because a supplier of unauthorized or counterfeit components would be expected to copy such a feature. Alternatively or additionally, a visible inspection may require the human operator or intelligent imaging system 140 to assess a quality of a visible feature and provide data indicative of the assessed quality within a selected or calculated range. A test such as this may provide a degree of certainty less than absolute certainty of the authenticity of a visible feature and, by association, a degree of certainty less than absolute certainty of the suitability or authenticity of the component being tested. Again, the result can be inputted at the interface 103 located at the work station 102 where the test is being performed.

Figure 3A:
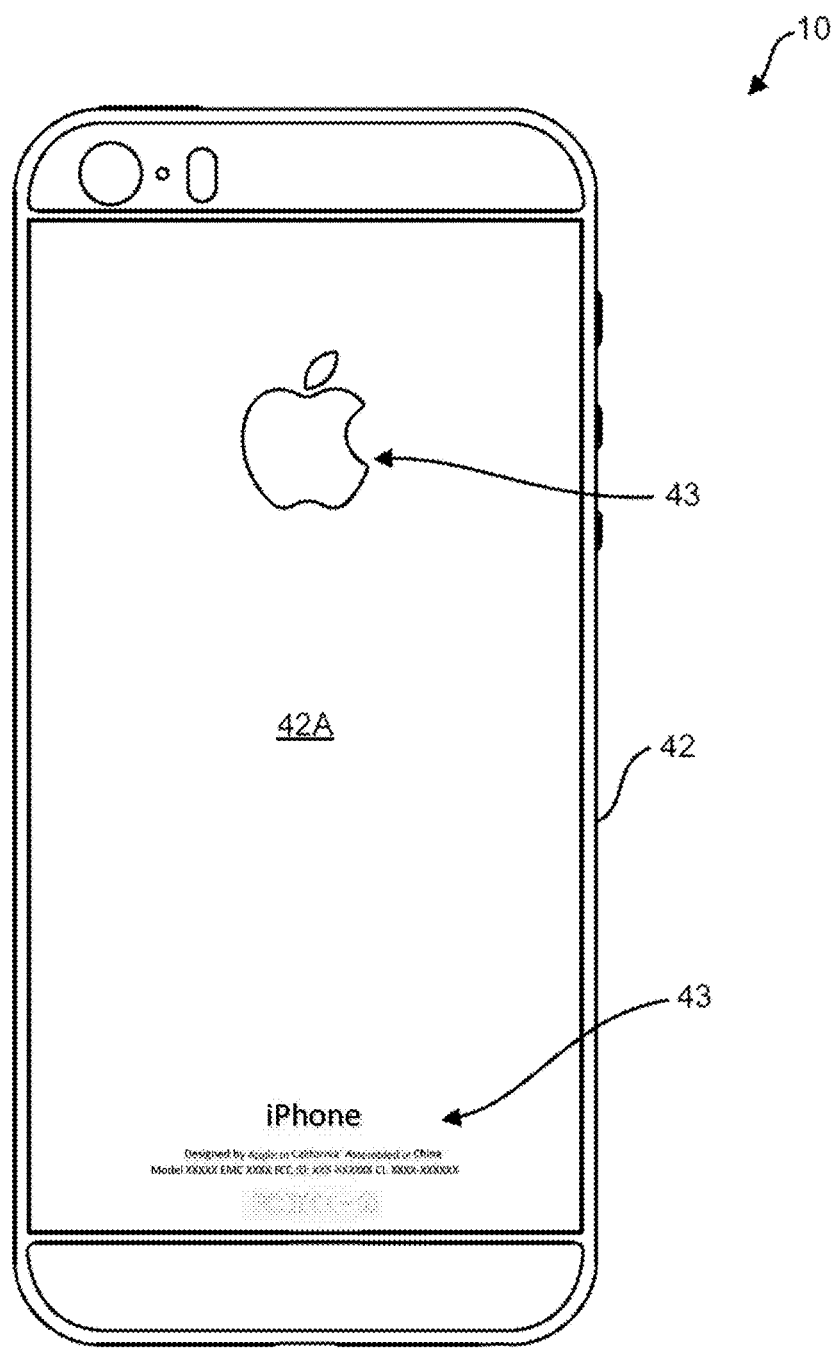
FIG. 3A is a view of an exterior surface of a back cover of the mobile electronic processing device of FIG. 1.

Referring to FIG. 3A which shows an exterior surface 42A of a back cover 42 of a mobile electronic processing device 10, one visual test may comprise the human operator or intelligent imaging system 140 grading the colour of the back cover exterior surface 42A against an expected colour for the model of the mobile electronic processing device 10. The grading decision may comprise a binary or objective decision of whether or not the colour of the back cover exterior surface 42A is considered to match the expected colour resulting in a "yes" or "no" input which could be represented in data as a "1" or "0" input. Alternatively, it may be a subjective decision by comparing the colour of the back cover exterior surface 42A against an expected colour for the model of the mobile electronic processing device 10 and selecting a value within a selected or calculated range considered or adjudged to be a measure of the amount by which the colour of the back cover exterior surface 42A differs from the expected colour. A subjective test may be preferred where it is known that the mobile electronic processing device end product provider uses a number of original equipment manufacturers (OEMs) to supply back covers and where it is recognized that some variations in expected colour arise from the use of different OEMs to supply back covers.

Another visual test may comprise the human operator or intelligent imaging system 140 checking the presence of expected trade images, logos, names, and/or product indicia 43 on the exterior surface of the back cover 42. Another visual test may involve checking the character and type of the expected trade images, logos, names, and/or product indicia 43, because a careless copyist may err in not matching expected trade images, logos, names, and/or product indicia to the correct models of the mobile electronic processing device 10. These tests may result in binary output data. Another visual test may involve visually checking the relative positions of the expected trade images, logos, names, and/or product indicia 43, but it may not, at least at this stage, involve measuring the positions of said expected trade images, logos, names, and/or product indicia 43 relative to each other or some selected datum line or point. Furthermore, another visual test may involve grading the quality of printing, painting, laser etching or any other suitable form of application of the expected trade images, logos, names, and/or product indicia 43. These latter tests may be subjective in nature and may require selection of a value within a selected or calculated range of values. Another visual test may comprise checking that each expected trade image, logo, name, and/or product indice 43 is applied using the expected form of application, e.g. printing, painting, laser etching, etc.

To assist a human operator in inputting data at the interface 103 of the work station 102, the interface 103 may present a questionnaire to the operator on a screen 105 of the interface 103 with a series of questions guiding the human operator through the sequence of visual tests or inspections of the component to be undertaken and guiding the human operator in the type of input data required, e.g. binary response such as "yes" or "no" or a graded response such as selection of a value from a range or scale. In the case of a graded response, the interface 103 may present a selected or calculated range of acceptable values for the human operator to make a selection. Devices such as slider bars may be presented on the screen 105 of the interface 103 to assist human operator value selection and data input. Where an intelligent imaging system 140 is used for one or more of the visual tests or inspections, the intelligent imaging system 140 will be configured to automatically follow the preferred sequence of visual tests or inspections and configured to input data responses of the correct type for each test or inspection and will make subjective selections based on an image comparison of an expected feature with a template for said expected feature.

It will be understood that questionnaires or templates for receiving human operator input may be provided by the interface 103 for any of the types of tests described herein and are not limited to the afore-described visual tests.

Figure 3B:
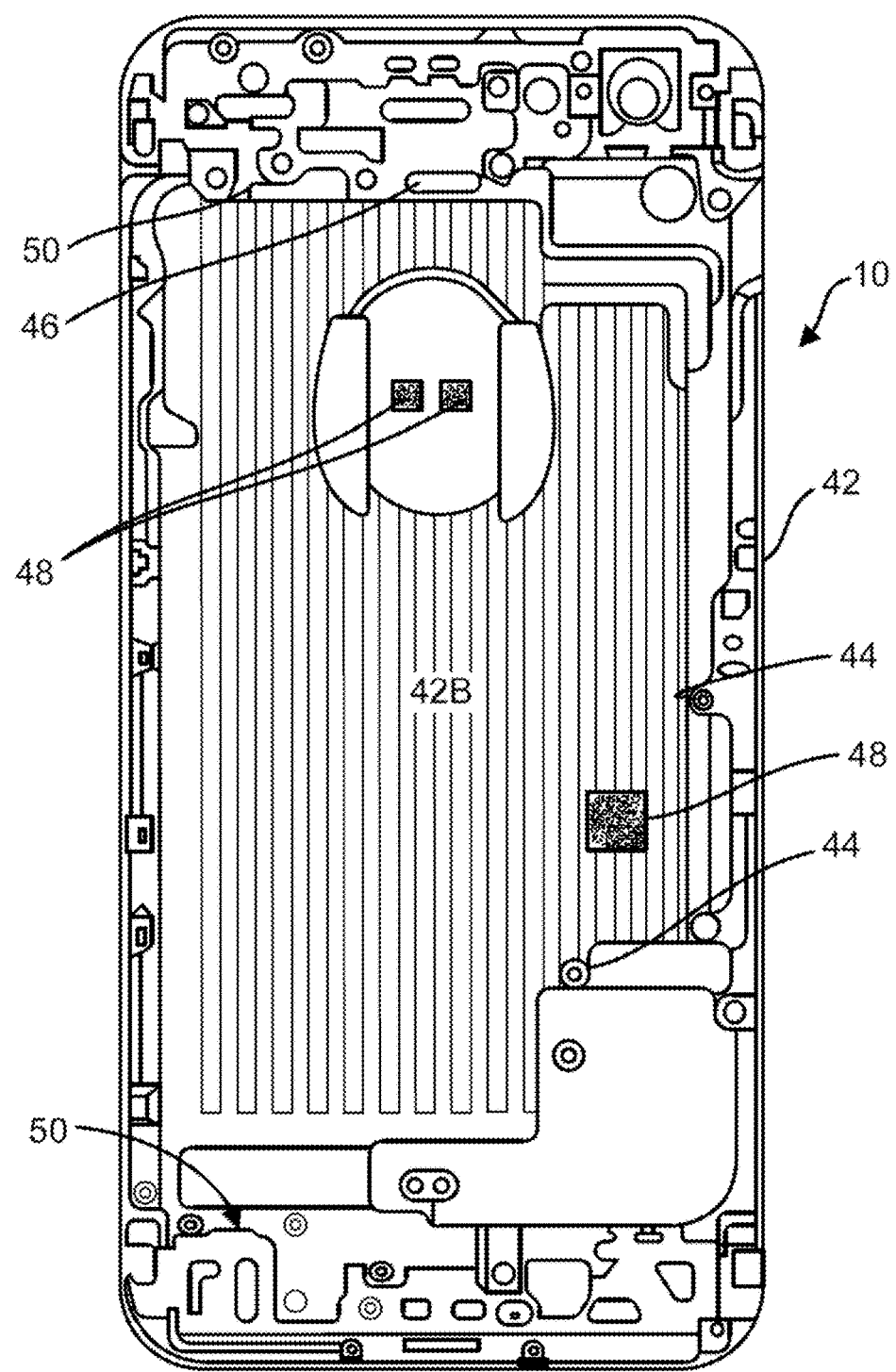
FIG. 3B is a view of an interior surface of a back cover of the mobile electronic processing device of FIG. 1.

Referring to FIG. 3B, this shows the interior surface 42B of the back cover 42 including features located on such surface 42B. All of the afore-described visual tests or inspections may also be applied to the interior surface 42B in a like manner to the exterior surface 42A. A non-exhaustive list of the features found on the interior surface 42B include screw mounting holes 44, gaskets 46, bar codes including 2D barcodes 48, and inserts 50 of various forms. For example, the human operator or intelligent imaging system 140 may be guided to assess the presence or absence and/or the expected positions of the screw mounting holes 44, gaskets 46, bar codes including 2D barcodes 48, and inserts 50 of various forms.

A further visual test may comprise identifying the presence of unexpected features not in accordance with known or derived standards or requirements of the end product supplier, manufacturer and/or designer. An unexpected feature might include, for example, a gasket at a position not consistent with gasket positioning in an authentic back cover 42. In view of the fact that components such as the back cover 42 are made to a very high engineering precision, it is not unknown for a copyist to struggle to achieve the same level of precision and to therefore pad out inconsistencies in dimensions of a copy back cover to improve or pad its fit with other components when being reassembled. Other unexpected features which can be visually assessed by a human operator or an intelligent imaging system include the inclusion of additional product markings such as bar codes which are not present in an authentic back cover 42.

Figure 3C:
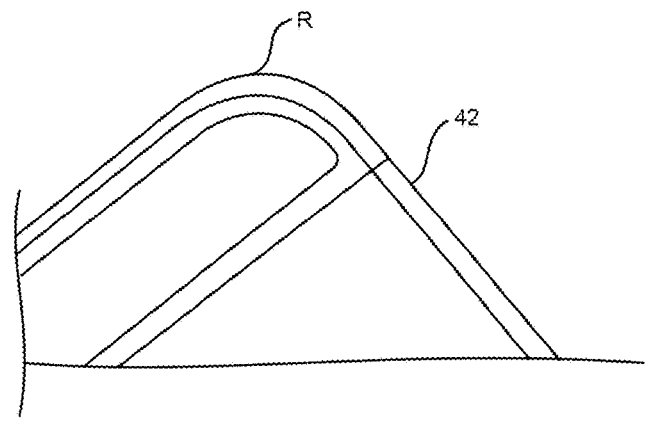
FIG. 3C is a close up view of a corner of a back cover of the mobile electronic processing device of FIG. 1.
Figure 3D:
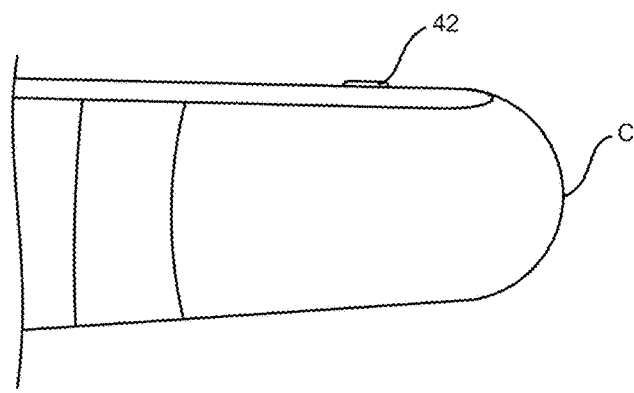
FIG. 3D is a close up view of a side wall of a back cover of the mobile electronic processing device of FIG. 1.

A second test or set of tests of a different technical character comprises making measurements of the component. One measuring test may comprise measuring the overall dimensions of the component. This may include or comprise assessing the shape and form of the component from its measured dimensions. For example, referring to FIGS. 3A-D, a measuring test may comprise measuring the length, width and depth of the component and comparing this to known or derived measurement data for components of the same type known or considered to be authentic components. It may further include or comprise measuring a thickness of the component or the material of the component at one or more selected points and again comparing the taken measurements with corresponding known or derived measurements. Furthermore, it may include or comprise measuring the roundness R of corners (FIG. 3C) and/or measuring the curvature C of one or more side walls (FIG. 3D). A another measurement test may comprise measuring the relative positions of expected features of a component relative to each other or to some datum line or point. For example, whilst a visual assessment may determine that all expected features are present at generally their expected positions or locations on a component, the measuring test may make precise measurements which reveal inconsistencies between those of the component being tested and the known or derived measurement data.

It will be understood that, where an intelligent imaging system 140 is utilized, it can be configured to perform the visual and measurements tests or inspections simultaneously.

A third test or set of tests of different technical character may comprise a hardness test of a material of the component or a part of a component to be compared with known or derived hardness data for the material of the component or the part of a component. Any of the hardness tests known to a skilled addressee may be utilized including indentation hardness, rebound hardness, scratch hardness by way of example.

A fourth test or set of tests of different technical character may comprise a fit test whereby an assessment is made of how precisely a component fits or meshes with other components of the mobile electronic processing device 10. Experience shows that, whilst copy components for a mobile electronic processing device 10 may individually appear to be made to the expected dimensions, small inconsistencies which may not be identified by either of the visual inspection or measurement inspection may become apparent when an attempt is made to fit the component being assessed with other components of the mobile electronic processing device 10 known or considered to be authentic.

A fifth test or set of tests of a different technical character may comprise an operational test whereby a function or operation of a component may be assessed against known or derived operational data. One test involves connecting a LCD assembly 14 in a test rig to power up the LCD screen and to examine the lit screen. One parameter which can be measured and compared to known or derived screen operational data is the screen resolution, i.e. the number of pixels in each dimension which can be displayed. Another parameter that can be measured and compared to known or derived screen operational data is the screen luminance, i.e. a photometric measurement of the luminous intensity per unit area of light travelling in a given direction from the screen surface.

It will be understood that a test or inspection of this type may not only serve the purpose of enabling a determination to be made of whether or not a LCD assembly 14, for example, is authentic, but may simultaneously enable authentic LCD assemblies 14 to be assessed for defects which would render them unsuitable for reassembly irrespective of whether or not they are adjudged to be authentic components.

Another type of operational test comprises testing the radio frequency (RF) response of the wifi antenna module 36 and comparing test data against known or derived RF operational data expected for such modules 36. The back cover 42 may also be subjected to a RF test to confirm conformance with expected grounding parameters.

It will be understood that different operational tests can be formulated for different components of the mobile electronic processing device 10 according to the modes of operation of such components.

Figure 4A:
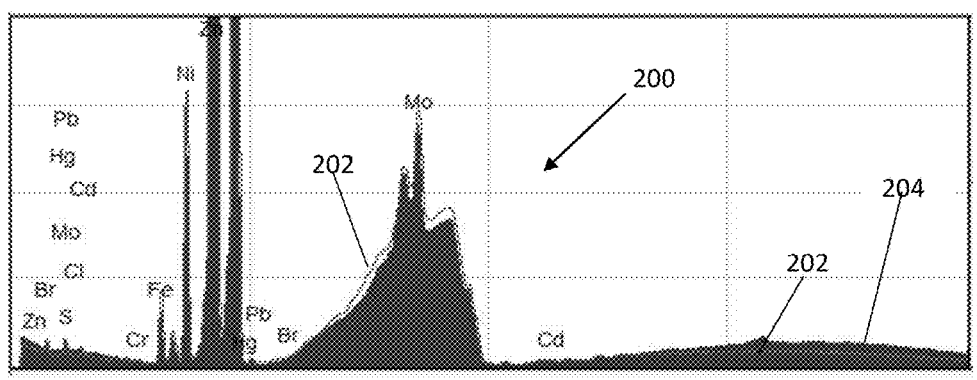
FIG. 4A shows a graphical representation of a spectroscopy test result for a material of a back cover of the mobile electronic processing device of FIG. 1.

A sixth test or set of tests of a different technical character may comprise a spectroscopy test on a material of a component or a material of a part of a component. Preferably, the spectroscopy test is an X-ray luminescence spectroscopy test. FIG. 4A shows a graphical representation 200 of a spectroscopy test result for a material of a back cover 42 of the mobile electronic processing device 10 in which the solid line 202 represents the known or derived spectroscopy data for a back cover known or considered to be authentic. The solid line spectroscopy data curve 202 may comprise a summation of data from a plurality of back covers known and/or considered to be authentic. The dark area curve 204 comprises the tested spectroscopy data for a back cover 42 under test. It will be appreciated that an assessment can be made of a degree of similarity between the tested back cover spectroscopy data curve 204 and the spectroscopy data curve 202. Any suitable curve difference algorithm may be utilized to provide a measure or value of difference and such a measure or value of difference may be compared to a selected or calculated threshold to enable a judgment to be made as to whether or not the tested back cover is to be considered or judged to be authentic or not. Furthermore, using the same test data, it is possible to identify chemical composition anomalies indicative that a back cover 42 is not authentic or likely not authentic. This may be more easily determined where a large spike in the back cover spectroscopy data curve 204 occurs where no such spike in the data is expected. It is also possible using the spectroscopy data to identify different authorized OEMs for the end product supplier. This is because experience has shown that there are often small variations in chemical compositions of the materials used by different OEMs. It is possible to make use of the intelligence gained when inconsistencies between otherwise passed tests for a component are identified. For example, it may be determined from coding on a component that a component has been supplied by a specific identifiable OEM. It may also be determined that the material used for say the back cover by this same OEM introduces a small chemical anomaly or has an identifiable chemical signature. However, a copyist who is unaware of the anomaly or chemical signature and who mimics the coding of the specified OEM on their copy back cover components may be caught by the fact that the material used by them does not include the specified OEM's chemical anomaly or chemical signature. The inconsistency between the coding assessment, described further below, and the chemical anomaly or signature obtained from the spectroscopy test may be sufficient to identify an otherwise high quality copy component as a copy and thus not an authentic component.

Figure 4B:
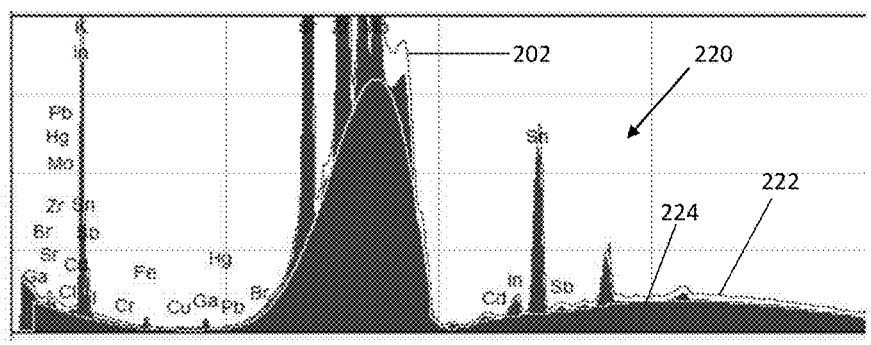
FIG. 4B shows a graphical representation of a spectroscopy test result for a material of a LCD assembly screen glass of the mobile electronic processing device of FIG. 1.

In similar manner to FIG. 4A, FIG. 4B shows a graph representation 220 of a spectroscopy test for a material of a LCD assembly screen glass of the mobile electronic processing device 10 in which the solid line 222 represents the known or derived spectroscopy data for a back cover known or considered to be authentic and the dark area curve 224 comprises the tested spectroscopy data for the LCD assembly 14 under test.

Figure 5A:
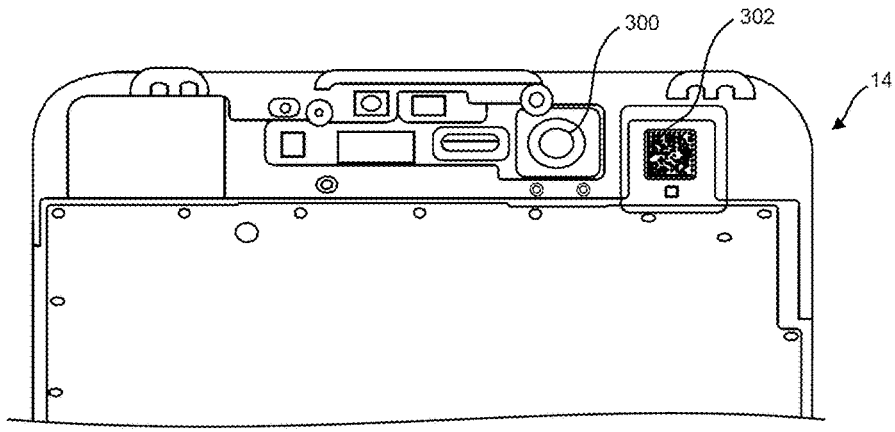
FIG. 5A shows a top section of a back surface of a LCD assembly of a mobile electronic processing device.
Figure 5B:
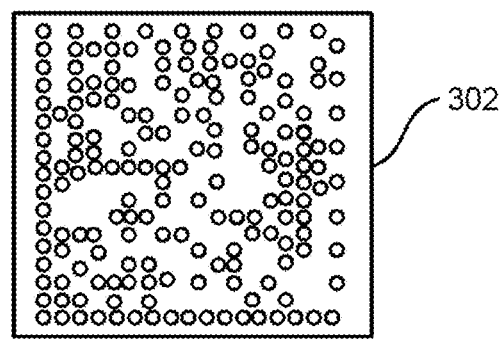
FIG. 5B shows an enlarged view of a 2D barcode of a type associated with a surface of a LCD assembly of a mobile electronic processing device.

A seventh test or set of tests of a different technical character may comprise reading data from barcodes marked on or associated with a component and processing said data. FIG. 5A shows a top section of a back surface of a LCD assembly 14 of a mobile electronic processing device 10, although of a different model to that shown in FIG. 1. Associated with a lens 300 of the LCD assembly 14 is a 2D barcode 302. An enlarged view of an example 2D barcode 302 is shown in FIG. 5B although it should be noted that this is not an enlarged view of the actual 2D barcode seen in FIG. 5A. FIG. 5C shows a table 400 of data read from the barcodes 302 for a plurality of LCD assemblies 14 under test. It can be seen that, for each sample, the barcode is 44 digits or characters in length 402. In each sample, the last three digits 404 are the same. In this example, the last three digits indicate a characteristic of the component, e.g. colour of a part of the component. Furthermore, it can be seen that the $4^{th}$ digit 406 has a same value for all samples. It is possible therefore to machine read the barcodes and to conduct a number of assessments or checks on the read data. One check is to compare the length of the read barcode to an expected length. A second check is to determine if one or more values at specified positions within the barcode take the expected values. The barcode encodes various pieces of information relating to the component, in this case the lens 300 of the LCD assembly 14. Further checks can be carried out to determine if the barcode carries the expected types of information and whether or not the elements of information are consistent with each other. Furthermore, the information obtained from a barcode can be checked against the test data of other tests to identify inconsistencies indicative of the lens or even the LCD assembly containing the lens not being authentic.

It will be understood that FIGS. 5B and 5C are provided by of illustration and do not contain real data.

It will also be appreciated that various ones of the components of the mobile electronic processing device 10 may carry one or more codes such as 2D barcodes as well as component numbers and model numbers. All or selected ones of the barcodes can be processed as aforesaid.

Figure 6:
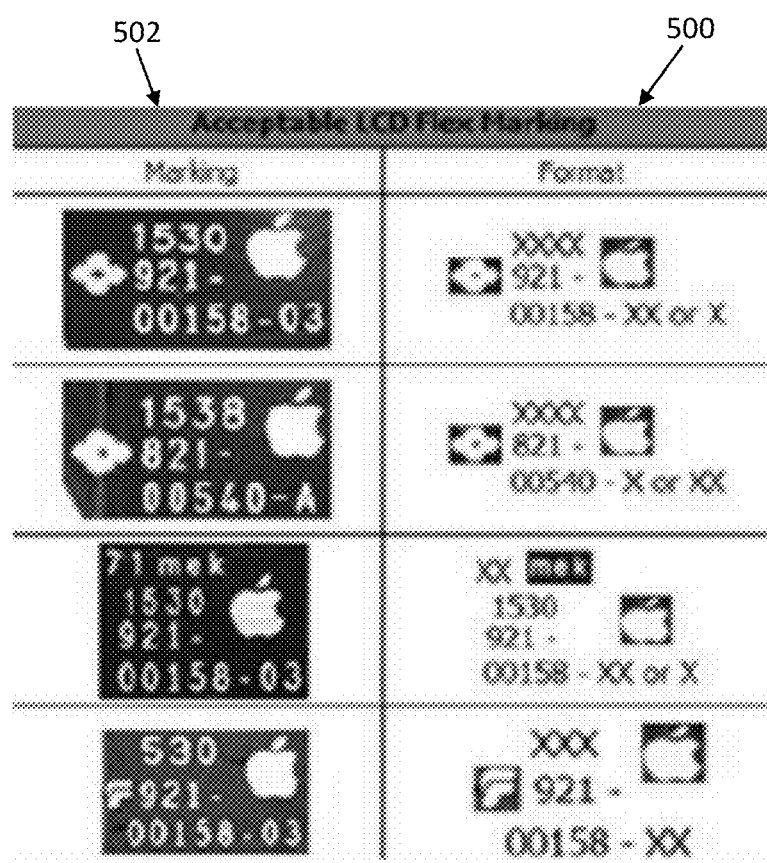
FIG. 6 illustrates acceptable LCD assembly markings for a LCD assembly of a mobile electronic processing device.

Various ones of the components of the mobile electronic processing device 10 may also carry component numbers and/or model numbers. It is therefore possible to also assess these numbers against expected data as illustrated by FIG. 6 which illustrates acceptable LCD assembly 14 flex cable markings formats 500 in the right-hand column and example component markings 502 in the left-hand column.

It is to be borne in mind that the tests described herein may be individually effective at any point in the testing process in identifying a component which is not suitable for reassembly into a mobile electronic processing device or is not an authentic component. Where it is possible to determine with certainty or with a high degree of confidence compared, for example, to a selected or calculated threshold that a component being tested is not suitable for reassembly into a mobile electronic processing device or is not an authentic component, then the testing of said component can be concluded without conducting further tests and the component discarded. However, it should be understood that unauthorized components of high quality may be deemed to pass individual tests, but the assessment of test data from all of the tests conducted to date on a component may identify inconsistencies between features, parameters, and or characteristics of said component which enable a determination to be made that the component, despite its high quality, is not an authorized component. In this context, an authorized or authenticated component is understood as being a component made with the permission of the end product supplier, manufacturer and/or designer for inclusion in an original end product or as a spare for the replacement market and which is made to the standards and/or requirements stipulated by the end product supplier, manufacturer and/or designer where these standards and/or requirements are known or derivable.

The process may include continually or periodically assessing incoming test data for a component being tested as it moves from one test work station 102 to another 102. It is possible therefore that a component which has been subjected to a plurality of tests, but not necessarily subjected to all projected tests for that type of component, may be judged or determined to have passed each individual test to date. However, an assessment of test data from the plurality of tests so far conducted may reveal inconsistencies between the results of the plurality of tests which enables a determination to be made that, despite the pass decision for each individual test, the component is not suitable for reassembly into a mobile electronic processing device or is not an authentic component. For example, it may be known that different OEMs introduce small variations in the components they supply. It may also be possible to determine from code information on a component which OEM is indicated as having supplied said component. Consequently, whilst a variation in a component peculiar to one OEM may not by itself be sufficient to prevent the component being determined to have individually passed the tests conducted to date, the inconsistency between the identity of the OEM determined from the variation and the identity of the OEM derived from the code information for the same component may enable a determination to be made that the component is from an unauthorized source despite its high quality. In such a case, the testing process for that component can also be concluded without the need to continue the testing process and the component discarded.

In many cases, the standards and/or requirements for components of an end product supplier, manufacturer, e.g. original equipment manufacturer (OEM), and/or designer are not publically available as they often comprise confidential or proprietary information of the end product supplier, manufacturer and/or designer. Consequently, the methods may include deriving data defining standards and/or requirements for components for the end product supplier, manufacturer and/or designer from components known to be authentic or considered with a high degree of confidence to be authentic. Such data may be derived by obtaining, e.g. purchasing, one or a plurality of new original end products, disassembling said end products and visually inspecting, assessing, measuring and/or testing said components to understand or at least derive data indicative of said standards and/or requirements for components for the end product supplier, manufacturer and/or designer. The derived data can then be used as a body of benchmarking data stored in the database 120 for assessing components. Furthermore, the body of benchmarking data may be augmented over time with data of tested components determined to be suitable for assembly in a mobile electronic processing device and/or determined to be authentic components.

More specifically, to establish a reliable base data set, experience has shown that a minimum of thirty authentic components of each type is required for assessment to determine a base set of data against which other components of the same type can be assessed when under test. One method of establishing said reliable data set is to obtain at least 30 mobile electronic processing devices which are known to be original or authentic and to disassemble said devices. Once the devices are disassembled, like parts are grouped and then assessed as to their characteristics using two or more of the tests described above and preferably at least two of the above-described tests of different technical character. Consequently, a base data set for authentic components is derived for a particular model of a mobile electronic processing device which is anticipated to identify tolerances in certain characteristics of the components. This is important as too large a degree of tolerance would allow non-authentic components to be passed as authentic and too narrow a degree of tolerance, e.g. where only the components of one or two devices were assessed, would cause authentic components to be judged as non-authentic.

In addition to or separately from the foregoing, embodiments of the invention may be arranged to implement a method of reconditioning a mobile electronic processing device where the method comprises firstly disassembling a mobile electronic processing device 10 at a first processing facility to at least obtain the main processor board assembly 24 having an operational IMEI of the disassembled mobile electronic processing device 10 stored in a memory of the main processor board assembly 26. Preferably, this step includes recovering components associated with the main processor board assembly 26 such as the battery 24, the loud speaker module 28 and the lightning connector and headphone jack module 30, although this is not essential as these components may be replaced by new or previously reconditioned components already available at the first facility. Other components or modules such as the LCD screen assembly 14, the back cover or housing assembly 42 and their associated components recovered from the disassembled mobile electronic processing device 10 are preferably transported to a second facility for further processing at said second facility. In this method, the important step is recovery of the main processor board assembly 24. Once the main processor board assembly 24 has been recovered, it is preferably assessed for suitability for reassembly in a mobile electronic processing device. If it is deemed suitable for reassembly, the method concludes by reassembling said main processor board assembly 26 with a reconditioned or new LCD screen assembly 14 and a reconditioned or new housing assembly 42 to thereby provide a reconditioned mobile electronic processing device 10 taking said IMEI of the disassembled mobile electronic processing device as the reconditioned device's operational IMEI. The advantage of this method is to render reconditioning of mobile devices much more efficient in returning reconditioned devices 10 to operation based on their associated IMEIs within a short period of time. The process at the first facility may include marking said IMEI on an exterior surface of the reconditioned mobile electronic processing device 10. The IMEI may be used in the first facility processing procedure as a unique identifier for the recovered main processor board assembly 26. As such, the IMEI can be used to track the recovered main processor board assembly 26 at any point in the first facility processing procedure. This assists in inventory control and allows recovery thresholds to be managed, e.g. the percentage of recovered main processor board assemblies 26 from any received batch deemed acceptable for reassembly into mobile electronic processing devices 10. It also enables data to be gathered during the first facility processing procedure on what, if any, repairs are necessary to such recovered main processor board assemblies 26 from any received batch deemed are necessary to render said main processor board assemblies 26 acceptable for reassembly into mobile electronic processing devices 10. Such data can be used to understand better the collective quality of batches of discarded, returned or damaged mobile electronic processing devices 10 from different sources. This data is particularly important to the operator of the reconditioning facilities where said operator finances the purchasing of batches of discarded, returned or damaged mobile electronic processing devices 10 from various sources where the yields may differ. In this context, "yield" refers to such things as the percentage of recovered main processor board assemblies 26 from any received batch deemed acceptable for reassembly into mobile electronic processing devices 10 and/or to the percentage of reconditioned mobile electronic processing devices 10 formed from any received batch of discarded, returned or damaged mobile electronic processing devices 10.

Preferably, reconditioned or new LCD screen assemblies 14 and reconditioned or new housing assemblies 42 are received at the first processing facility prior to receiving the or a batch of mobile electronic processing devices for disassembly. The reconditioned LCD screen assemblies 14 and reconditioned housing assemblies 42 may be received from the second facility whereby they are formed by reassembling recovered components previously obtained from disassembled devices 10 and transported from the first facility to the second facility.

Preferably, where a recovered main processor board assembly 26 is found not suitable for reassembly in a mobile electronic processing device then the first facility processing procedure may include sending said main processor board assembly 26 to a work station 102 for one or more of repairing and reconditioning. The work station 102 may be located in the first facility. However, in some embodiments, the work station 102 for one or more of repairing and reconditioning of the not yet suitable main processor board assembly 26 may be located at the second processing facility and thus may require the not yet suitable main processor board assembly 26 to be transported to said second facility. This is advantageous where the yield for recovered suitable main processor board assemblies 26 is high since it negates the need for a repairing and reconditioning work station 102 to be located in the first facility, but has little impact on the efficiency or turnaround time of providing reconditioned mobile electronic processing devices 10 from said first facility.

To determine whether or not a main processor board assembly 26 is suitable for reassembly may simply comprise attaching the main processor board assembly 26 to a suitably adapted test bed to power up said main processor board assembly 26. Failure to power up will deemed the main processor board assembly 26 to be not yet suitable or even defective. However, it is preferred that the test is more rigorous and includes testing data inputs and/or data outputs from the main processor board assembly 26 against expected or test data in order to make a suitability determination. More preferably, the main processor board assembly 26 is subjected to a plurality of tests where at least two of said tests are of a different technical character to each other and test data derived from each of said plurality of tests are then assessed to determine to a selected or calculated degree of confidence whether or not the main processor board assembly 26 and/or components thereof is to be considered as suitable for reassembly in a mobile electronic processing device 10.

The plurality of tests may include at least one test which, based on data derived from such test, provides a selected or calculated, but not absolute degree of confidence that the tested main processor board assembly 26 and/or components thereof is suitable for reassembly in which case the process of testing may be continued where the degree of confidence is above a selected or calculated threshold.

The plurality of tests may include at least one test which, based on data derived from such test, provides an absolute certainty that the tested main processor board assembly 26 and/or components thereof is not authentic, in which case the process of testing is concluded and the tested main processor board assembly 26 and/or components thereof is identified as not being suitable for reassembly in a mobile electronic processing device 10.

The plurality of tests of a first technical character and the methodologies for such tests may comprise any one or more of the tests and/or methodologies as hereinbefore described.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of reconditioning a mobile electronic processing device, the method comprising the steps of:
    disassembling a mobile electronic processing device to at least obtain a main processor board assembly having an operational International Mobile Equipment Identity (IMEI) of the disassembled mobile electronic processing device stored in a memory of the main processor board assembly;
    assessing suitability of the main processor board assembly for reassembly in a mobile electronic processing device; and, if suitable,
    reassembling said main processor board assembly with a reconditioned or new LCD screen assembly and a reconditioned or new housing assembly to thereby provide a reconditioned mobile electronic processing device taking said IMEI of the disassembled mobile electronic processing device as its operational IMEI.

2. The method of claim 1, further comprising the step of marking said IMEI on an exterior surface of the reconditioned mobile electronic processing device.

3. The method of claim 1, wherein all of the steps are performed in a first processing facility.

4. The method of claim 3, further comprising the step of sending all disassembled parts of the disassembled mobile electronic processing device save for the main processor board assembly to a second processing facility.

5. The method of claim 3, further comprising the step of receiving at the first facility one or more reconditioned or new LCD screen assemblies and one or more reconditioned or new housing assemblies prior to receiving the mobile electronic processing device for disassembly.

6. The method of claim 1, wherein, if at the assessment step, the main processor board assembly is found not suitable for reassembly in a mobile electronic processing device then sending said main processor board assembly to a work station for one or more of repair and reconditioning.

7. The method of claim 1, wherein the assessment step comprises:
    subjecting said main processor board assembly or components thereof to a plurality of tests where at least two of said tests are of a different technical character to each other; and
    assessing test data derived from each of said plurality of tests to determine to a selected or calculated degree of confidence whether or not the main processor board assembly or components thereof is to be considered as suitable for reassembly in a mobile electronic processing device of a type to which the tested main processor board assembly or components thereof belongs.

8. The method of claim 7, wherein the plurality of tests includes at least one test which, based on data derived from such test, provides a selected or calculated, but not absolute degree of confidence that the tested main processor board assembly or components thereof is suitable for reassembly in which case the process of testing is continued if the degree of confidence is above a selected or calculated threshold.

9. The method of claim 7, wherein the plurality of tests includes at least one test which, based on data derived from such test, provides an absolute certainty that the tested main processor board assembly or components thereof is not authentic, in which case the process of testing is concluded and the tested main processor board assembly or components thereof is identified as not being suitable for reassembly in a mobile electronic processing device of a type to which the type of tested main processor board assembly or components thereof belongs.

10. The method of claim 7, wherein one of the plurality of tests of a first technical character comprises one or more of: a physical test; and a visual test; and another of the plurality of tests of a second, different technical character comprises one or more of: a spectroscopy test; an operational test; and a data processing test.

11. The method of claim 7, wherein the data derived from each test is assessed against data compiled from one or more main processor board assembly or components thereof of the same type known, considered or assessed to be authentic and/or from one or more main processor board assembly or components thereof of the same type known with absolute certainty to be authentic.

12. The method of claim 7, wherein the data derived from each test is assessed against data for a main processor board assembly or components thereof of the same type provided by any of a manufacturer, supplier, or designer of the mobile electronic processing device or from an authorized supplier of main processor board assemblies or components thereof to the manufacturer, supplier, or designer of the mobile electronic processing device.

13. The method of claim 7, wherein the data derived from each test is assessed against data compiled from prior testing of one or more main processor board assembly or components thereof of the same type.

14. The method of claim 7, wherein one of the plurality of test comprises one or more of a data processing test of the component and an operational process of the component.

15. A system for reconditioning a mobile electronic processing device, the system comprising:
    a system for disassembling a mobile electronic processing device to at least obtain a main processor board assembly having an operational International Mobile Equipment Identity (IMEI) of the disassembled mobile electronic processing device stored in a memory of the main processor board assembly;

a system assessing suitability of the main processor board assembly for reassembly in a mobile electronic processing device; and, if suitable, and a system for reassembling said main processor board assembly with a reconditioned or new LCD screen assembly and a reconditioned or new housing assembly to thereby provide a reconditioned mobile electronic processing device taking said IMEI of the disassembled mobile electronic processing device as its operational IMEI.

* * * * *